United States Patent [19]

Eberly

[11] Patent Number: 4,977,122
[45] Date of Patent: Dec. 11, 1990

[54] CRACKING CATALYST

[75] Inventor: Paul E. Eberly, Baton Rouge, La.

[73] Assignee: Exxon Research and Engineering Company, Florham Park, N.J.

[21] Appl. No.: 361,892

[22] Filed: Jun. 5, 1989

[51] Int. Cl.$^5$ ............................................. B01J 29/06
[52] U.S. Cl. ..................................... 502/69; 502/214; 502/68
[58] Field of Search ...................... 502/64, 68, 69, 208, 502/214

[56] References Cited

U.S. PATENT DOCUMENTS

| | | | |
|---|---|---|---|
| 4,567,152 | 1/1986 | Pine | 502/64 |
| 4,584,091 | 4/1986 | Pine | 502/64 |
| 4,818,739 | 4/1989 | Gortsema et al. | 502/67 |
| 4,839,319 | 6/1989 | Schuette et al. | 502/64 |
| 4,861,935 | 8/1989 | Bakas et al. | 585/474 |
| 4,870,222 | 9/1989 | Bakas et al. | 585/467 |

Primary Examiner—Patrick P. Garvin
Assistant Examiner—George R. Fourson
Attorney, Agent, or Firm—Chris P. Konkol

[57] ABSTRACT

A catalyst is provided which comprises a crystalline zeolite, discrete particles of phosphorus containing alumina, particularly an alkaline earth metal phosphate containing alumina, dispersed in a non-zeolitic inorganic oxide matrix. A catalytic cracking process utilizing the catalyst is also provided. Such phosphate treated catalysts exhibit increased attrition resistance.

11 Claims, No Drawings

CRACKING CATALYST

BACKGROUND OF THE INVENTION

The present invention relates to a catalyst and its use in a catalytic cracking process. More particularly, this invention relates to a zeolite containing cracking catalyst in combination with an alkaline earth metal phosphate and its use in a catalytic cracking zone.

In commercial catalytic cracking processes, a trend in recent years has been to use heavier feed stocks which contain more Conradson carbon precursors and metal contaminants such as nickel, vanadium, and iron. As a result, more coke is made in the catalytic cracking zone, leading to higher regenerator temperatures and requiring in some cases the use of catalyst coolers. In addition to excessive coke making, other factors such as metal contaminants lead to deactivation and destruction of the active zeolite component. Product selectivity also suffers, leading to more gas production, especially hydrogen, and lower gasoline yield.

To overcome these adverse effects, at least partially, alumina is frequently added to the catalyst mixture in the cracking zone to assist in bottoms conversion, and increase the catalyst material's resistance to nitrogen and metals. However, coke making is increased. It has previously been found that monoammonium phosphate (MAP) treatment of the alumina is effective in lowering coke while still maintaining the desirably resistance to the aforementioned contaminants. While the MAP treatment is a desirable improvement in cracking heavy feed, some disadvantages accrue since MAP is soluble and only a portion is deposited on the catalyst requiring the manufacturer to employ additional steps to recover the remaining phosphate from the effluent plant streams. Also, the MAP treatment has been found to form a catalyst which is less resistant to attrition.

There is therefore a need for a catalyst for the cracking of petroleum based feedstocks which makes less coke, has increased metals resistance, exhibits lower attrition, and is easier to manufacture.

Hydrocarbon cracking catalysts comprising a zeolite and discrete particles of alumina dispersed in an inorganic oxide matrix are known. See, for example, U.S. Pat. No. 4,283,309 and U.S. Pat. No. 4,259,212. Although the added alumina particles, which in themselves prior to being composited with the other components have relatively little cracking activity, the catalysts comprising the added alumina particles have increased activity, increased vanadium resistance, and increased bottoms conversion. However, such catalysts exhibit undesired coke production.

U.S. Pat. Nos. 4,584,091 and 4,657,152 to Pine disclose that by treating the alumina particles with certain phosphorus compounds prior to compositing the alumina particles with the other catalysts or catalysts precursor components, the catalyst comprising the phosphorus-treated alumina particles has increased selectivity for naphtha components and produces less coke and gas.

U.S. Pat. No. 4,454,241 discloses a phosphorus containing zeolitic catalyst made from a clay starting material. The catalyst is obtained by contacting a partially cation exchanged calcined zeolite-containing catalyst with a dihydrogen phosphate anion, e.g. ammonium hydrogen phosphate or dihydrogen phosphite anion.

U.S. Pat. No. 3,507,778 discloses a zeolite in combination with a phosphate promoted silica-magnesia catalyst for cracking petroleum fractions. Example 4 discloses an ammonium phosphate.

U.S. Pat. No. 4,228,036 discloses a cracking catalyst comprising an alumina-aluminum phosphate silica matrix composited with a zeolite.

U.S. Pat. No. 4,179,358 discloses a cracking catalyst comprising zeolite dispersed in a magnesia-alumina-aluminum phosphate matrix.

U.S. Pat. No. 4,430,199 discloses passivation of contaminant metals on cracking catalysts by phosphorous addition. The phosphorus compound may be ammonium hydrogen phosphate. The phosphorus compound may be impregnated on an inert carrier such as calcined metakaolin clay that can be blended with the catalyst or added to the catalyst. In particular, reference is made to column 3, line 17 to 20 and column 10, lines 20 to 25.

SUMMARY OF THE INVENTION

In accordance with the invention, there is provided, a catalyst combination comprising: (a) a crystalline metallosilicate zeolite; (b) a non-zeolitic inorganic oxide matrix; and (c) discrete particles of phosphorous-containing alumina dispersed in said matrix, said discrete particles having been prepared by contacting alumina with a phosphorus compound selected from the group consisting of an alkaline earth metal salt of phosphoric acid or phosphorous acid and mixtures thereof for a time sufficient to incorporate an effective amount of phosphorus and alkaline earth in said alumina. In accordance with the invention, there is also provided a catalytic cracking process utilizing the above-stated catalyst.

DETAILED DESCRIPTION OF THE INVENTION

The present invention is directed to a catalyst comprising a zeolite, discrete particles of alumina containing an alkaline earth metal salt of phosphoric or phosphorous acid and a non-zeolite inorganic oxide matrix. It has been found that such a catalyst exhibits significant improved attrition properties to otherwise similar catalysts.

In addition to an improved catalyst, the present invention is directed to the process of making the catalyst. The process is advantageous because less environmental pollution is produced. The alkaline earth phosphorous containing compounds used to make the present zeolites are less soluble in water than other phosphorous containing compounds. Consequently, industrial waste from the manufacturing process is minimized and, at the same time, waste disposal is less of a problem since it is less detrimental to the environment.

The Zeolite Component

Suitable zeolites for use as component of the catalyst of the present invention are any of the naturally occurring or synthetic crystalline zeolites. Examples of these zeolites include the zeolites designated by the Linde Division of Union Carbide by the letters X, Y, A, L (These zeolites are described in U.S. Pat. Nos. 2,882,244; 3,130,007; 3,882,243; and 3,216,789, respectively). Naturally occurring crystalline zeolites such as faujasite, chabazite, erionite, mordenite, offretite, gmelinite, analcite, etc., ZSM-5 zeolites, such as described in U.S. Pat. No. 3,702,886; ferrosilicates; zeolites such as those described in U.S. Pat. No. 4,238,318; borosilicate zeolites such as those described in Belgian Patent No. 859656.

In general, the chemical formula of anhydrous crystalline metallosilicate zeolites expressed in terms of moles may be represented by the formula: $0.9\pm0.2M_{2/n}O:W_2O_3:ZSiO_2$, wherein M is selected from the group consisting of hydrogen, hydrogen precursors, monovalent, divalent and trivalent cations and mixtures thereof; n is the valence of the cation and Z is a number of at least 2, preferably at least 3, said value being dependent upon the particular type of zeolite. W, a metal in the anionic framework structure of the zeolite, may be aluminum, gallium, boron, iron, etc. Preferably, the zeolite is a crystalline aluminosilicate zeolite. More preferably, the zeolite is a Y-type zeolite. By "Y-type zeolite" is intended herein a zeolite having a silica to alumina mole ratio of at least about 3, the structure of faujasite and uniform pore diameters ranging from about 6 to about 15 Angstroms. Most preferably, the zeolite has a unit cell size below 24.7 Angstroms. For example, zeolites having unit cell size below about 24.5 Angstroms are known as "stablized" or "ultrastable". Y-type faujasite described in U.S. Pat. No. 3,293,192; U.S. Pat. No. Re 28,629 (Reissue of U.S. Pat. No. 3,402,996); U.S. Pat. No. 4,036,739; U.S. Pat. No. 3,781,199 and U.S. Pat. No. 4,036,739. The zeolites as produced or found in nature normally contain an alkali metal cation such as sodium and/or potassium and/or an alkaline earth metal cation such as calcium and magnesium. The zeolites differ from each other in structure, composition and ratio of silica to metal oxide contained in the crystal lattice. For use as hydrocarbon conversion catalyst component, it is usually necessary to decrease the alkali metal content of the crystalline metallosilicate zeolite to a content of less than 10 wt. %, preferably less than 6 wt. %, more preferably less than 1 wt. %. The alkali metal content reduction, as is known in the art, may be conducted by exchange with one or more metal cations as well as with a hydrogen cation or hydrogen precursor (e.g. $NH_4+$) capable of conversion to the hydrogen cation. Preferred cations include rare earth metals, calcium, magnesium, hydrogen and mixtures thereof. Ion exchange methods are well-known in the art and are described, for example, in U.S. Pat. No. 3,140,249; U.S. Pat. No. 3,140,251 and U.S. Pat. No. 3,142,353, the teachings of which are hereby incorporated by reference. The concentration of hydrogen cation in the finished zeolite will be that concentration equivalent to the difference between the theoretical cation concentrations of the particular zeolite and the amount of cation present in the form of exchanged metal cation and a residual alkali metal cation.

The particle size of the zeolite component may range from about 0.1 to 10 microns, preferably from about 0.5 to 3 microns. Suitable amounts of the zeolite component in the total catalyst will range from about 1 to about 70, preferably from about 1 to about 40, more preferably from about 10 to 40 wt. % based on the total catalyst.

The Alumina Comoonent

The alumina component of the catalyst of the present invention is present as discrete particles of alumina treated with an alkaline metal earth salt of phosphorous with or without phosphoric acid. Suitable alumina starting material for the phosphorous treatment of the present invention is alumina having a total surface area, as measured by the method of Brunauer, Emmett and Teller (BET) greater than 20 square meters per gram ($M^2/g$), preferably greater than 140 $M^2/g$, for example, from out 145 to 400 $M^2/g$. Preferably the pore volume (BET) of alumina will be greater than 0.10 cc/g. The alumina may comprise a minor amount of silica such as suitably from about 0.1 to 15 weight percent, preferably from about 0.1 to 6 weight percent silica, based on the weight of the alumina component of the particles. Preferably, the porous alumina will be bulk alumina. Although size is not critical, a finer particle size is preferable since it permits a more compact catalyst particle to be formed having higher attrition resistance. The material produced by ball milling, for example, is preferred. The term "bulk" with reference to the alumina is intended herein to designate a material which has been preformed and placed in a physical form such that its surface area and porous structure are stabilized so that when it is added to an inorganic matrix containing residual soluble salts, the salts will not alter the surface and pore characteristics measurably. The initial alumina particles are contacted with an alkaline earth phosphorus compound for a time sufficient to composite phosphorus and alkaline earth with the alumina particles.

Suitable alkaline earth phosphates contain one or more elements of Group IIA of the periodic table. These include beryllium, magnesium, calcium, strontium, and barium. Preferably, the phosphate additive is magnesium, calcium, strontium or barium phosphate and most preferably magnesium or calcium phosphate. The phosphate compounds are sparingly soluble materials. This property enables more efficient use since limited losses will occur in the effluent water. Also the alkaline earth phosphates will not tend to exchange with the zeolite incurring loss in cracking activity.

Suitable amounts of phosphorous to be incorporated with the alumina include at least about 0.1 wt. %, generally from about 0.1 to 7 wt. %, preferably at least 0.2 wt. %, more preferably from about 0.5 wt. % to 5.0 wt. %, calculated as elemental phosphorous, based on the weight of the alumina. With these preferred amounts of phosphorous, a corresponding amount of alkaline earth will be associated according to the formula, $M_3(PO_4)_2$. Thus, if the alkaline earth is magnesium, the broad range includes 0.42 to 29.7% $Mg_3(PO_4)_2$, preferably at least 0.85 wt. %, more preferably from 2.12 wt. % to 21.2% For the other alkaline earth phosphates, including beryllium, calcium, strontium, and barium, the preferred amounts can be readily calculated from their respective molecular weights. Contact of the alumina with a liquid medium (such as water) comprising the phosphorus compound is suitably conducted at a pH ranging from about 2.0 to about 8.0. Suitable concentrations of the phosphorus compound in the liquid medium may range from about 0.05 to about 5 wt. %. Treating time and temperatures are not critical and may range from about ambient temperature, that is, from about 60° F. to about 250° F. The phosphorus-treated alumina particles are recovered from the liquid medium (dried for example, at a temperature of about 800° F. for 2 hours). The resulting phosphorus-treated alumina particles may suitably be present in the catalyst of the present invention in amounts ranging from about 5 to about 50 wt. %, preferably from about 10 to about 30 wt. %, based on total catalyst.

The Inorganic Oxide Matrix Component

The inorganic oxide matrices suitable as component of catalysts of the present invention are nonzeolitic inorganic oxides, such as silica, alumina, silica-alumina, magnesia, boria, titania, zirconia and mixtures thereof. The matrices may include one or more of various known clays, such as montmorillonite, kaolin, halloysite, bentonite, attapulgite, and the like. Most preferably, the inorganic oxide will be a silica, or alumina, or a nonzeolitic silica-alumina combined with an appropriate amount of clay. Suitable matrices include the type of matrices prepared from a sol such as described in U.S. Pat. No. 3,867,308; U.S. Pat. No. 3,957,689 and U.S. Pat. No. 4,458,023. The matrix component may be present in the catalyst of the present invention in an amount ranging from about 40 to about 99 weight percent, preferably from about 60 to about 90 wt. % based on the total catalyst. It is also within the scope of the invention to incorporate in the catalyst other materials to be employed in cracking catalysts such as various other types of zeolites, clays, carbon monoxide oxidation promoters, etc.

Catalyst Preparation

The catalyst of the present invention may be prepared by any one of several methods. The alkaline earth phosphates can be added to the catalyst in any one or more of several ways. For example the phosphate can be added to the alumina either by slurry, partial dissolution with acidified aqueous media (i.e., use of phosphoric acid), dry mixing, or dry mixing coupled with ball milling. Alternatively, the alkaline earth phosphate can be directly added to the catalyst composite. The latter can contain one or more of the following components: an active zeolite component, silica, alumina, silica/alumina, clay, and other additives which are well known in the prior art.

A preferred method of preparing one of the catalysts of the present invention, that is, a catalyst comprising a silica-alumina matrix and phosphorus-treated alumina particles dispersed in the matrix, is to react sodium silicate with a solution of sulfuric acid and aluminum sulfate to form a silica-alumina sol. Separately, the bulk alumina is made, for example, by reacting solutions of sodium aluminate and aluminum sulfate under suitable conditions, aging the slurry to give the desired pore properties of the alumina, filtering, drying, reslurrying in water to remove sodium and sulfate ions and drying to reduce the volatile matter content to less than 15 wt. %. The alumina is then treated with an alkaline earth phosphate compound as previously described. The phosphate-treated alumina particles are slurried in water and blended in proper amounts with a slurry of impure silica-alumina sol and clay. The zeolite component is added to this blend. Preferably, the zeolite is a Y-type zeolite having a unit cell size below about 24.7 Angstroms preferably below 24.5 Angstroms. A sufficient amount of each component is utilized to give the desired final composition. The resulting mixture is then spray dried to produce dry solids. The dry solids are subsequently reslurried in water and washed substantially free of undesired soluble salts. The catalyst is then dried to a residual water content of less than about 15 wt. %. The dried catalyst is recovered. The catalyst of the present invention is particularly suited for catalytic cracking of hydrocarbons.

Catalytic cracking with the catalysts of the present invention can be conducted in any conventional catalytic cracking manner. Suitable catalytic cracking conditions include a temperature ranging from about 700° to about 1,300° F. and a pressure ranging from about subatmospheric to about five atmospheres, typically from about atmospheric to about 60 psig. The process may be carried out in a moving bed, ebullating bed, slurry, transfer line, or fluidized bed operation. Preferably, the process is conducted in a transfer line, or fluidized bed reactor. The catalyst of the present invention can be used to convert any of the conventional hydrocarbon feeds used in catalytic cracking, that is, it can be used to crack naphthas, gas oils and residual oils having a high content of metal contaminants. It is especially suited for cracking hydrocarbons boiling in the gas oil range, that is, hydrocarbon oils having an atmospheric pressure boiling point ranging from about 450° to about 1,100° F. to yield products having a lower boiling point while producing less coke and gas.

DESCRIPTION OF THE PREFERRED EMBODIMENT

The following examples are presented to illustrate the invention. Catalysts of the invention and comparative catalysts were prepared and tested for cracking activity in a standard microactivity test (MAT) described in the *Oil and Gas Journal*, 1966 vol. 64, pages 7, 84, 85 and Nov. 2, 1971 pages 60–68. Two hydrocarbonaceous oil feedstocks were used, herein designated "FS-5078" and "FS-5363." The characteristics of these feedstocks are given in the following table:

Feedstock Inspections

| Feedstock No. | 5078 | 5363 |
| --- | --- | --- |
| Gravity, °API | 26.2 | 22.5 |
| Sulfur, wt % | n/a | 1.15 |
| Nitrogen, ppm | 569 | 633 |
| Aniline Point | 166.5 | 179 |
| Refractive Index | 1.4803 | 1.4928 |
| Pour point, °F. | 65 | 90 |

Hivac C Dist °F.

| | | |
| --- | --- | --- |
| IBP, | 582 | 710 |
| 5% | 594 | 740 |
| 10% | 624 | 752 |
| 20% | 655 | 788 |
| 30% | 671 | 810 |
| 40% | 687 | 821 |
| 50% | 705 | 852 |
| 60% | 721 | 873 |
| 70% | 739 | 931 |
| 80% | 756 | 936 |
| 90% | 770 | 966 |
| 95% | 786 | 990 |
| FBP | 802 | 1025 |

The term, "Specific Coke", is intended herein to be defined as (Wt % Coke on Feed)/$x(1-x)$, where $x$ is the fraction of feed converted to material boiling below 400° F. As usual in catalytic cracking, the coke is included in the material defined as boiling below 400° F. Similarly, the "Specific Hydrogen" is defined as (Wt % Hydrogen on Feed)/$x(1-x)$, where $x$ has the same definition as before. In the examples described below, the starting alumina was straight run alumina (SRA) commercially available from Davison Chemical Company.

COMPARATIVE EXAMPLE 1

An alumina mixture was made by charging 2 jars with 1902 grams of as received SRA alumina, 71.6% solids, and 10 lbs. water. The contents were ball milled overnight and discharged into a plastic bucket using 10 lbs. more water for rinse. 1948 grams of ultra stable Y zeolite were slurried in. The ultra stable Y zeolite used was Davison's grade Z-14 U.S. 96.8% solids). The mixture was colloid milled.

Meanwhile, a silica-alumina gel was made as follows: a sodium silicate solution was made by diluting 13.9 lbs. of sodium silicate with 18.9 lbs. of water. An alum solution was made by dissolving 3217 gms. of alum, containing the equivalent of 15.9% A1203, in 8.9 lbs. H2O. The alum solution was then mixed with 24.2 lbs. of 20 wt. % sulfuric acid solution. A silica-alumina sol was made by mixing the sodium silicate solution with enough of the acid-alum solution to produce a sol having a pH of 3.0.

The silica-alumina sol was cooled and diluted by adding 7.0 lbs. of ice. Then, 2993 grams of Thiele clay were slurried in and the mixture colloid milled. The pH of the alumina-zeolite slurry was adjusted to 3.-3.7 using 20% sulfuric acid and the slurry added to the silica-alumina-clay slurry. The mixture was stirred 5 minutes and then spray dried at 650° F. inlet, 350° F. outlet, 25,000 rpm adjusting the Moyno pump to keep these conditions. The spray dried catalyst was washed several times with ammonium sulfate solutions that contained added NH4OH to raise the pH to 8.0. The catalyst was then dried at 150° C. for 16 hours and then calcined 4 hours at 1,000° F. The final composition of the catalyst was 20% USY zeolite, 30% SRA alumina, 30% kaolin, and 20% silica. A portion was steamed for 16 hours at 1,400° F. for analytical and MAT activity tests. The catalyst is designated here "Catalyst A" and is not a catalyst of the invention, but was prepared for comparative purposes, as more fully explained below.

COMPARATIVE EXAMPLE 2

A phosphorous containing solution was made by dissolving 600 gms. of monoammonium phosphate (MAP) in 70 lbs. of water. Alumina (16.0 lbs.) that had been previously calcined for 4 hours at 1,000° F. was slurried into the phosphorous containing solution. The treatment is equivalent to 60 grams of MAP per lb. of alumina. The mixture was stirred about 2 hours at room temperature and then filtered. The wet cake was rinsed with distilled water and dried. The dried product was then calcined for 4 hours at 1,000° F. The phosphate treated alumina calculated to contain 3.56 wt. % P.

An alumina mixture was made by charging each of 2 jars with 1362 grams of the MAP treated alumina and 10 lbs. of water. The mixture was ball milled for 16 hours and discharged into a plastic bucket using 10 lbs. more water for rinse. 1948 grams of ultrastable Y zeolite were slurried in. The brand of zeolite was Davison's grade Z-14 US (96.8% solids). The mixture was colloid milled. Meanwhile, a silica-alumina gel was made as follows: a sodium silicate solution was made by diluting 13.9 lbs. of sodium silicate with 18.9 lbs. of water. An alum solution was made by dissolving 3217 gms of alum, containing the equivalent of 15.9% Al2O3, in 8.9 lbs. H2O. The alum solution was then mixed with 24.2 lbs. of 20 wt. % sulfuric acid solution A silica-alumina sol was made by mixing the sodium silicate solution with enough of the acid-alum solution to produce a sol having a pH of 3.0.

The silica-alumina sol was cooled and diluted by adding 7.0 lbs. of ice. Then 2993 grams of kaolin clay from Thiele, Ga. were slurried in and the mixture colloid milled. The pH of the alumina-zeolite slurry was adjusted to 3.5 to 3.7 using 20% sulfuric acid and the slurry added to the silica-alumina-clay slurry. The mixture was stirred 5 minutes and then spray dried at 25,000 rpm; 550° F. inlet; 350° F. outlet, adjusting the Moyno pump to maintain these conditions. About 10.8 lbs. total material were obtained. The spray dried catalyst was washed several times with ammonium sulfate solutions that contained added NH4OH to raise the pH to 8.0. The catalyst was then dried at 150° C. for 16 hours and then calcined 4 hours at 1,000° F.

The final composition was 20% USY, 30% MAP treated alumina, 30% clay and 20% silica. The catalyst is designated herein "Catalyst B" and is not a catalyst of the invention, but was prepared for comparative purposes as more fully explained below.

EXAMPLE 3

This catalyst material was prepared analogously to the composition of Example 1, however, 3% magnesium phosphate was added. 5 lbs. of a catalyst identical to Catalyst A of Example 1 was steamed for 16 hours at 1,400° F. Magnesium phosphate Mg3(PO4)2.8H2O (100 g) was ball milled 16 hours. A slurry was formed from 13.6 g of this magnesium phosphate in one liter of water and 291 grams of the previously steamed catalyst was added. The slurry was put through a colloid mill, filtered, dried and calcined. For MAT testing, the catalyst was steamed 16 hours at 1,400° F.

The final composition of the catalyst was 3% Mg3(PO4)2, deposited on a 20% USY zeolite, 30% SRA alumina, 30% clay, and 20% SiO2 (300 grams). The catalyst is designated herein "Catalyst C" and is a catalyst of the present invention.

EXAMPLE 4

The catalyst material was prepared analogously to the composition of Example 2, however, 10% magnesium phosphate in SRA alumina was used instead of MAP. 227 grams of Mg3(PO4)2.8H2O was mixed with SRA alumina (71.6% solids) and ball milled overnight. 7 lbs. of water were used as rinse. The material was filtered and dried at 150° C. for 16 hours. Then, it was calcined for 4 hours at 1000° F. The magnesium phosphate treated alumina (681 g) was ball milled with 6 lbs. of water overnight. The mixture was discharged with 2 lbs. of water for rinse. The remainder of the preparation was the same or analogous to the preparation of Catalyst A in Example 1 above.

The final composition of the catalyst was 20% USY zeolite, 30% (10% Mg3(PO4)2 treated SRA), 30% clay, and 20% silica. The catalyst is designated herein "Catalyst D" and is a catalyst of the present invention.

EXAMPLE 5

The preparation of this catalyst material was analogous to the preparation in Example 4, with the exception that 20% magnesium phosphate on SRA alumina was used instead of 10%. 5 lbs. of material was made using 681 g of 20% Mg3(PO4)2 on alumina, 469 g of Z-14 USY, and 748 g Thiele Clay. The final composition of the catalyst was 20% USY catalyst, 30% (20% Mg3(PO4)2 treated SRA), 30% clay and 20% silica. This catalyst is designated herein "Catalyst E" and is a catalyst of the present invention.

EXAMPLE 6

The preparation was exactly the same as in Example 5, except that the SRA alumina was treated with 30% magnesium phosphate instead of 20%. The final composition of the catalyst was 20% USY zeolite, 30% (30% Mg3(PO4)2 treated SRA), 30% clay, and 20% silica (5 lbs.). This catalyst is designated "Catalyst F" herein and is a catalyst of the present invention.

COMPARATIVE EXAMPLE 7

This catalyst preparation was the same as Example 1 above, except that a higher alumina content and a lower zeolite USY content was used. 1268 g. of SRA alumina (71.6% solids) was ball milled with 6 lbs. of water overnight. The mixture was discharged with 2 lbs. of water for rinse. The Davison Z-14 USY as received (243 g.) zeolite was slurried in and put through a colloid mill. The silica-alumina sol was made as in Example 1, except that only one fourth of the amount of sol was used. Ice in the amount of 1.78 lbs. were added to the sol and them 748 g of Thiele clay was slurried in. The slurry was colloid milled and the pH adjusted to 3.0 to 3.2 using 20% $H_2SO_4$. The silica-alumina slurry was added to the zeolite-alumina slurry and stirred 5 minutes. The resulting mixture was spray dried at 350° F. bottom temperature and 30,000 rpm with a Moyno pump (2.0 setting). The final composition of the catalyst was 10% USY zeolite, 40% SRA alumina, 30% clay, and 20% silica. This catalyst is designated "Catalyst G" herein and is not a catalyst of the present invention.

EXAMPLE 8

This catalyst material was prepared analogously to the catalyst of Example 2, except that the SRA alumina was treated with an acidified solution of 10% magnesium phosphate.

Magnesium phosphate (66% solids) (229g) was slurried in 17 lbs. water. Phosphoric acid was added to the slurry until the pH was equal to about 4. This was one in order to induce partial solubility of the magnesium phosphate. The SRA alumina (1902 g) was then added and the slurry stirred with heating for 6-8 hours. The material was filtered, washed, dried, and calcined for 4 hours at 1,000° F. The remainder of the preparation was identical to that for Catalyst A.

The final composition of the catalyst was 10% USY zeolite, 40% of SRA alumina treated with acidified 10% magnesium phosphate, 30% clay, and 20% silicon. This catalyst is designated herein as "Catalyst H" and is a catalyst of the present invention.

EXAMPLE 9

This catalyst material was the same as in Example 7, except that 908 g of $Mg_3PO_4$ was slurried in 17 lbs. water. The alumina was added to the slurry and the mixture stirred with heating for 6-8 hours. After filtering, washing, drying and calcining, the catalyst was prepared according to the procedure for Catalyst A. The final composition was 10% USY, 40% of an SRA alumina which had been treated with 10% magnesium phosphate, 30% clay, and 20% silica. This catalyst material is designated herein "Catalyst I" and is a catalyst of the present invention.

EXAMPLE 10

This catalyst material was prepared as in example 7, except that 908 g of magnesium phosphate or $Mg_3(PO_4)_2$ treated alumina was used. Also, the alumina was ball milled with the magnesium phosphate in water for a 16 hour period. The final composition was 10% USY zeolite, 40% of an SRA alumina which had been treated with 10% magnesium phosphate, 30% clay, and 20% silica. This catalyst material is designated herein as "Catalyst J" and is a catalyst of the present invention.

EXAMPLE 11

This catalyst material was prepared as in Example 7, except that 908 g of dicalcium phosphate or $Ca_3(PO_4)_2$ treated alumina was used. Also, the alumina was slurried, but not ball milled with the calcium phosphate. The final composition was 10% USY zeolite, 40% SRA alumina treated with 10% dicalcium phosphate, 30% clay and 20% silica. This catalyst material is designated "Catalyst K" herein and is a catalyst of the present invention.

Table I below compares the performance of the catalysts prepared in the above examples, basically of 20% USY, 30% alumina, 30% clay, and 20% silica. The alumina component has been treated in various manners as indicated in the table. In one case, Catalyst C, the entire catalyst was treated with magnesium phosphate. From the results shown with the lighter feed (FS-5078), it is apparent the Catalyst A containing the untreated alumina gives the highest specific coke. This is reduced by treating the alumina with monoammonium phosphate (MAP); however, the Davison attrition is greater than desired. All the catalyst containing magnesium phosphate give lower specific cokes than the MAP Catalyst A while, at the same time, maintaining good attrition resistance. Similar results are observed with the MAT data on the heavier feed (FS-5363).

Further data are shown in Table II below on the catalysts containing 10% USY, 30% clay, 20% silica, and 40% of alumina treated in various ways with magnesium and calcium phosphate. In all cases the specific coke was less than that seen with Catalyst G containing untreated alumina.

The use of an alkaline earth metal phosphate is also seen to improve the metal tolerance of the catalyst. Data illustrating this effect are shown in Table III. With each catalyst, a portion was impregnated with vanadium acetylacetonate, dried, calcined, and steamed at 1,400° F. Both materials suffered a loss in activity and an increase in specific coke and hydrogen upon vanadium impregnation. However, Catalyst J containing the magnesium phosphate shows much less of a loss in activity and a considerably lower specific coke than Catalyst G having the untreated alumina. This illustrates the remarkable ability of magnesium phosphate to dilute the deleterious effects of vanadium. Similar beneficial effects are seen with the nickel impregnated catalysts upon magnesium phosphate addition.

Attrition resistance of catalysts can be a major problem in catalytic cracking especially in regard to grid plugging. The effect of alumina addition, MAP treatment, and magnesium phosphate addition are seen in Table IV below. As the amount of alumina is increased, the catalyst attrits more easily. The catalysts containing the MAP treated aluminas appear to attrit more easily than those having the untreated aluminas. The example of the magnesium phosphate treated alumina gives an attrition value only slightly higher than the untreated alumina.

TABLE I

Catalysts Containing 20% USY - 30% Al$_2$O$_3$ - 30% CLAY - 20% SiO$_2$

| Catalyst | A | B | C | D | E | F |
|---|---|---|---|---|---|---|
| Al$_2$O$_3$ Treatment | NONE | MAP (1) | Total Cat. TRTD with 3% Mg$_3$(PO$_4$)$_2$ | 10% Mg$_3$(PO$_4$)$_2$ | 20% Mg$_3$(PO$_4$)$_2$ | 30% Mg$_3$(PO$_4$)$_2$ |
| % Mg$_3$(PO$_4$)$_2$ | 0 | 0 | 3 | 3 | 6 | 9 |
| Dav. Attrition, % | 5.0 | 17.0 | — | 6.0 | 4.0 | 4.0 |
| STMD. 16 H 1400° F. | | | | | | |
| Conv., % (FS-5078) | 62.1 | 58.7 | 58.4 | 63.1 | 62.9 | 61.4 |
| H$_2$, % | 0.0479 | 0.0341 | 0.0415 | 0.0468 | 0.0431 | 0.040 |
| Coke, % | 2.178 | 1.636 | 1.408 | 1.739 | 1.572 | 1.615 |
| Sp. H$_2$ | 0.029 | 0.024 | 0.030 | 0.027 | 0.025 | 0.025 |
| Sp. Coke | 1.329 | 1.151 | 1.003 | 1.017 | 0.929 | 1.015 |
| Conv., % (FS-5363) | 73.0 | — | 68.3 | 71.9 | 71.4 | 66.9 |
| 400–650° YLD., % | 21.4 | — | 24.7 | 22.3 | 22.2 | 22.8 |
| H$_2$, % | 0.065 | — | 0.060 | 0.065 | 0.058 | 0.052 |
| Coke, % | 3.796 | — | 2.58 | 2.88 | 2.660 | 2.601 |
| Sp. H$_2$ | 0.024 | — | 0.028 | 0.025 | 0.023 | 0.026 |
| Sp. Coke | 1.404 | — | 1.197 | 1.126 | 1.066 | 1.287 |

(1) 60 Grams Map/lb. Al$_2$O$_3$

TABLE II

Catalysts Containing 10% USY - 40% Al$_2$O$_3$ - 30% CLAY - 20% SiO$_2$

| Catalyst | G | H | I | J | K |
|---|---|---|---|---|---|
| Al$_2$O$_3$ Treatment | None | 10% Mg$_3$(PO$_4$)$_2$ + H$_3$PO$_4$ | 10% Mg$_3$(PO$_4$)$_2$ Slurry | 10% Mg$_3$(PO$_4$)$_2$ Ball Milled | 10% Ca$_3$(PO$_4$)$_2$ Slurry |
| % Mg$_3$(PO$_4$)$_2$ | 0 | 4 | 4 | 4 | 4 |
| STMD. 16 H @ 1400° F. | | | | | |
| Conv., % (FS-5078) | 56.2 | 52.1 | 56.8 | 58.2 | 54.9 |
| H$_2$, % | 0.064 | 0.050 | 0.057 | 0.063 | 0.065 |
| Coke, % | 2.15 | 1.27 | 1.86 | 1.85 | 1.86 |
| Sp. H$_2$ | 0.050 | 0.046 | 0.043 | 0.045 | 0.053 |
| Sp. Coke | 1.67 | 1.17 | 1.41 | 1.33 | 1.53 |

TABLE III

Metals Resistance of 10% USY - 40% Al$_2$O$_3$ - 30% CLAY - 20% SiO$_2$ Catalysts (FS-5078)

| Catalyst | Al$_2$O$_3$ Treatment | ppm. Metal | Conv. % | N$_2$, % | Coke, % | Sp. H$_2$ | Sp. Coke |
|---|---|---|---|---|---|---|---|
| G | None | 0 | 56.2 | 0.064 | 2.15 | 0.050 | 1.67 |
|   |   | 2000 V | 40.8 | 0.386 | 2.83 | 0.560 | 4.10 |
|   |   | 500 Ni | 52.7 | 0.157 | 2.23 | 0.141 | 2.00 |
| J | 10% Mg$_3$(PO$_4$)$_2$ Ball Milled | 0 | 58.1 | 0.063 | 1.85 | 0.045 | 1.33 |
|   |   | 2000 V | 48.5 | 0.367 | 2.61 | 0.340 | 2.78 |
|   |   | 500 Ni | 57.5 | 0.108 | 1.98 | 0.080 | 1.57 |

TABLE IV

DAV. Attrition, % (Catalysts contain 20% USY + 20 SiO$_2$)

| % Al$_2$O$_3$ | % CLAY | Untreated | MAP Treated | Mg$_3$(PO$_4$)$_2$ Treated |
|---|---|---|---|---|
| 0 | 60 | 1.0 | — | — |
| 10 | 50 | 3.0 | 4.0 | 3.0 |
| 20 | 40 | 4.0 | 8.0 | 8.0 |
| 30 | 30 | 4.0 | 17.0 | 4.7 |
| 40 | 20 | 13.0 | 40.0 | 8.0 |

The scope of this invention is not intended to be limited to the aforementioned examples. Other variations in the process and products of the present invention will be evident to one skilled in the art.

What is claimed is:

1. A catalyst comprising: (a) a crystalline metallosilicate zeolite; (b) a non-zeolitic inorganic oxide matrix, said zeolite being dispersed in said matrix, and (c) discrete particles of phosphorus-containing alumina also dispersed in said matrix, said discrete particles having been prepared by contacting alumina having a BET surface area greater then 20 square meters per gram with a phosphorus compound selected from the group consisting of an alkaline earth metal salt of phosphoric acid or phosphorous acid and mixtures thereof, for a time sufficient to incorporate an effective amount of phosphorus in said alumina.

2. The composition of claim 1 wherein said phosphorus compound is selected from the group consisting of a beryllium, magnesium, strontium, calcium, or barium salt of phosphoric acid or of phosphorous acid and mixtures thereof.

3. The composition of claim 1 wherein said phosphorus is present in said discrete particles of alumina in an amount of at least about 0.1 wt. % based on the weight of said discrete particles of alumina, calculated as elemental phosphorus.

4. The composition of claim 1 wherein said phosphorus is present in said discrete particles of alumina in an amount ranging from about 0.2 to about 7.0 wt. %, calculated as elemental phosphorus, based on the weight of said discrete particles of alumina.

5. The composition of claim 1 wherein said catalyst comprises from about 0.04 to about 2.0 wt. % of said phosphorus.

6. The composition of claim 1 wherein said zeolite is a Y-type zeolite having a unit cell size below 24.7 Angstroms.

7. The composition of claim 1 wherein said zeolite is an ultrastable Y-zeolite having a unit cell size below about 24.5 Angstroms.

8. The composition of claim 1 herein said matrix is selected from the group consisting of silica, alumina, silica-alumina, magnesia, zirconia, titania, boria, chromia, clay, and mixtures thereof.

9. The composition of claim 1 wherein said matrix comprises silica-alumina.

10. The composition of claim 1 wherein said zeolite is an ultrastable Y-type zeolite present in an amount ranging from about 1 to about 70 wt. %, said discrete particles of phosphorus-containing alumina being present in an amount ranging from about 5 to about 50 wt. %, said phosphorus being present in an amount ranging from about 0.5 to about 5.0 wt. %, based on said discrete particles of alumina, and wherein said matrix comprises silica-alumina.

11. The composition of claim 1 wherein said phosphorous compound is magnesium or calcium phosphate.

* * * * *